United States Patent [19]

Kühner et al.

[11] 4,366,139
[45] Dec. 28, 1982

[54] PROCESS FOR THE PRODUCTION OF WATER CONTAINING CARBON BLACK PREPARATIONS

[75] Inventors: Gerhard Kühner, Hanau; Wilhelm Berndt, Frankfurt; Lothar Rothbühr, Hürth; Hans Wagner, Maintal, all of Fed. Rep. of Germany

[73] Assignee: Degussa Aktiengesellschaft, Frankfurt, Fed. Rep. of Germany

[21] Appl. No.: 125,711

[22] Filed: Feb. 28, 1980

[30] Foreign Application Priority Data

Mar. 2, 1979 [DE] Fed. Rep. of Germany ....... 2908202

[51] Int. Cl.³ .......................... C01B 31/02; C09C 1/48
[52] U.S. Cl. ..................................... 423/449; 423/450; 106/307; 23/314; 264/117
[58] Field of Search ............... 423/445, 449, 450, 455, 423/436, 468, 460, 461; 34/10, 12; 106/307; 23/324; 264/117

[56] References Cited

U.S. PATENT DOCUMENTS

| | | | |
|---|---|---|---|
| 2,213,059 | 8/1940 | Tugerstrom | 23/314 |
| 2,538,482 | 1/1951 | Studebaker | 34/12 X |
| 2,550,802 | 5/1951 | Gholson | 23/314 |
| 3,245,820 | 4/1966 | Metore et al. | 423/460 |
| 3,597,170 | 8/1971 | Dollinger | 264/117 |
| 3,799,788 | 3/1974 | Jordan et al. | 423/445 |
| 3,901,823 | 8/1975 | Dimitri et al. | 23/314 |

OTHER PUBLICATIONS

The Condensed Chemical Dictionary, 1961, p. 666.

*Primary Examiner*—O. R. Vertiz
*Assistant Examiner*—Gregory A. Heller
*Attorney, Agent, or Firm*—Beveridge, DeGrandi & Kline

[57] ABSTRACT

Beaded carbon black is disclosed with a water content of 30 to 80% by weight which are used for coloring of paper and concrete. The product has the advantage of dust-free handling and a higher jet black color compared to conventional carbon black powder.

5 Claims, No Drawings

PROCESS FOR THE PRODUCTION OF WATER CONTAINING CARBON BLACK PREPARATIONS

Carbon black is used in the paper industry as a black pigment in the production of black, gray or shaded paper or cardboard.

Carbon black, as compared to organic dyes and colored pigments is relatively cheap and is absolutely stable against light and chemicals. Furthermore, when working carbon black into paper or cardboard pulps it produces an excellent intensity of color and has a covering power compared to other color tints, such as white or brown of the paper/cardboard pulp, which is greater than is the case with other black pigments. It is possible with special kinds of carbon black to produce paper with definite electrical conductivity values. Papers pigmented with carbon black are used for decorative purposes, protective photo packagings, albums, cables and recording papers.

Another important field of operation wherein carbon black is used for black and gray coloring, is in the construction industry. In this case cement or asbestos cement is colored. This concerns primarily the coloring of roofing tiles, asbestos-cement slabs, cement-bound building plates, flooring, slabs for super highways, etc.

Both in the case of paper manufacture as well as in cement and asbestos-cement processing one operates in the aqueous medium. Therefore, the following requirements exist for the color carrying carbon black, both for the use in coloring paper as well as for the use in coloring cement:

1. Good dispersability in the aqueous system
2. High jet black color
3. Great coloring strength
4. High stability against light and chemicals
5. Low price By high jet black color, the blackness is meant, which is reached in the full tint; by "coloring strength" on the contrary is meant the ability of black pigment for overtinting the white tone of a white pigment or the white tone of the paper pulp/cement.

Despite unchallenged advantages, the use of carbon black is problematical. The carbon black per se has a hydrophobic character and thus may not easily be dispersed in aqueous systems. Since the smallest quantities of carbon black will cause intensive colorations and the customary powdered carbon black types dust easily, the processing of carbon black leads to considerable soiling of the manufacturing plants and to a considerable nuisance to the employees in these plants.

Especially in case of working with cement, difficulties arise in the use of dry powdered carbon black, as a result of the low bulk weight of the carbon black and the high bulk weight of the cement. The difference in bulk weight causes the carbon black to float on the surface and to be difficult to wet.

Even conversion into a dry beaded carbon black can produce no satisfactory solution for this problem. For even dry beaded carbon black still contains portions of dusty material.

It is true, that the beaded carbon black may be solidified by adhesive additives and the dust content may thereby be reduced to a minimum, but such a product becomes more difficult to disperse. That means longer processing times or the use of more expensive dispersing apparatus.

Powdered carbon black and dry beaded carbon black are the only two forms in which the carbon black is produced and packed in one operation. It has been known, to be sure, in order to avoid the dusting problem, to additionally process carbon black in an intermediate processing step, with water and dispersing agents into powdery or liquid dispersions.

This additional operating step however, calls for the fact that previously prepared carbon black is taken from its original package, and that carbon black is processed in edge millers or with high speed dispersion stirrers with water and possibly with wetting agents and that a new packaging then takes place.

Sometimes in this case additional processings, such as grinding or centrifuging are necessary. It is obvious that these additional operational steps are time consuming and expensive.

The production of beaded carbon black with the help of a pin shaft granulator has been described in Ullmann's Encyclopedia of Chemical Engineering, 4th Ed., Vol. 14, Pages 639–640 and that disclosure is relied on herein.

Now it has been surprisingly determined that the width of application of the bead-making machines customarily used for the manufacture of carbon black granules may be widened, and that by a change of the carbon black-water ratios, intentionally non-dusting, aqueous carbon black preparations of a powdery, bead-shaped or liquid character, may be produced continuously.

With the process of the present invention, it should be possible to solve the task of producing suitable carbon black preparations in the production of furnace-blacks, lamp blacks or gas blacks in one operation and continuously without resort to additional machines. The solution of this task succeeds in case of the process of the invention by producing furnace blacks, lamp blacks or gas blacks in one continuous production process, by separating it from the exhaust gases, by feeding it continuously to a bead-making machine used for the production of carbon black granules, by producing in the bead-making machine by controlled addition of water, a non-dusting, easily dispersable preparation with a powdery, bead-like or liquid character and by then packaging it, whereby the water content is adjusted such that the preparation contains between 30 and 80% of water. Insofar as a low viscosity liquid preparation is preferred, it turned out to be advantageous to add a dispersing or wetting agent to the bead-water, preferably in solution.

For this purpose, it is possible in a bead-making machine, which consists of 1 or 2 cylindrical passageways equipped in the inside with rotating pin shafts whereby the two passageways have a length of 240 cm and a diameter of 52 cm to convert 1,000–2,000 kg of carbon black into a preparation. The rpm of the rotating pin shafts may be varied between 250–800 rpm.

As auxiliary dispersion or wetting agents, anionic and non-ionic wetting agents may be used. Among the anionic products, alkylsulfonates, arylalkylsulfonates, natural lignin sulfonates and modified lignin sulfonates are particularly effective. From the group of the non-ionic wetting agents, ethoxylates are considered as particularly effective.

The quantity of wetting agents for the production of pumpable dispersions should be between 0.5 and 12% in relation to the quantity of carbon black used, preferably between 5 and 10% by weight.

The advantage of the new process therefore is to be seen in the fact that non-dusting carbon black preparations may be produced for the paper, cardboard and cement industry:
1. In one operation without additional dispersing apparatus and additional plants;
2. Without expensive drying;
3. Without intermediate packaging;
4. Always in the desired form as powdery or bead-shaped or liquid preparations without change of machines.

These carbon black preparations cause no dust whatever. They may easily be processed and dispersed for use.

A special advantage of the invention as compared to a process with intermediate packaging, resides in the fact that the freshly produced carbon black has experienced no compaction whatever, so that the production of the dispersion goes on easily without any great expenditure of time and energy. Beyond that the dispersions offer an excellent state of dispersion, free of nodules.

The measures needed for carrying out the process of the invention are to be made clear by the succeeding examples.

EXAMPLE 1

In a furnace black production plant, 950 kg of carbon black with characteristics enumerated below are produced continuously per hour:

| Nitrogen-surface area (DIN 60 132) | $m^2/g$ | 118 |
| --- | --- | --- |
| Electromicroscopic particle size | nm | 20 |
| DBP-number (ASTMD 2414-76) | ml/100g | 140 |
| Coloring strength in relation to IRB 3 (DIN 53 204) | % | 110 |

This carbon black is inserted into a double-pass bead-making machine, the passageways of which have a length of 240 cm and a diameter of 52 cm.

The rpm of the pin shafts rotating in the passageways is adjusted to 264 and 488 rpm. 1,370 l/h of water are injected from two water nozzles. After passage through the two passageways a bead shaped product absolutely free of dust and with an outwardly dry appearance is obtained, which contains about 59.1% of water.

This product was ground on the edge mill for a period of 30 minutes with a batch of paper pulp of the following composition so that a paper with 5 or 10 parts by weight of carbon black was obtained.
  35% by weight of ground wood: (flash dried, unbleached)
  65% by weight of pulp: (pine-Sulfite unbleached +- beech-sulfate bleached 1:1, meas. 36° SR)
  12.2% by weight of the pigment produced as in Example 1.

The ground material was beaten up by the pulper, mixed with 3% by weight of thin glue and acidified with 3% by weight of alum.

After that the paper pulp was converted into paper on an apparatus "Rapid Koethen", whereby paper sheets were obtained with a weight of 100 g/m².

On the basis of the dust-free form of the pigment, of production of paper took place without any development of dust, a jet black coloration was obtained, as was demonstrated by the measurement of the white-content of the top side and underside of the sheets of paper formed:

5 parts by weight of carbon black
  white content top side: 5.5
  white content underside: 5.4
10 parts by weight of carbon black
  white content top side: 4.1
  white content underside: 4.2

EXAMPLE 2

Carbon black in powder form was introduced into a paper mixture as in Example 1, as a comparative experiment. There was considerable soiling, which would not be permissible in a plant that produces white and grey/black papers simultaneously.

After production of the papers in an analogous form as in Example 1, paper samples were produced, wherein a carbon black content of 5 and 10 parts per weight was used.

Subsequently, the white content achieved on the paper was compared:

|  | Powder Carbon Black | Carbon Black Preparation According to Example 1 |
| --- | --- | --- |
| 5 parts by weight of carbon black |  |  |
| white content top side | 5.6 | 5.5 |
| white content underside | 5.5 | 5.4 |
| 10 parts by weight of carbon black |  |  |
| white content top side | 4.2 | 4.1 |
| white content underside | 4.1 | 4.2 |

Since lower values of the white content correspond to a higher jet black color, one may state that in the present example, as a result of the carbon black preparation of Example 1
  a. All difficulties of dust are eliminated;
  b. A good dispersion took place;
  c. The product of the invention produced at least equal, overwhelmingly however, higher jet black color than powdered carbon black.

EXAMPLE 3

The method of operation according to example 1 will permit the production of a pigment which enables a dust-free processing in case of edge mill dispersion. In many paper factories however, there are no edge mills, in that case it will be necessary to insert the additives into the pulper or into the vats.

In that case, not only a dust-free form of the pigment will be necessary, but the pigment must be distributed uniformly without considerable mechanical dispersion work. That may however, be expected only of pumpable fluids.

Therefore, an attempt was made to produce a pumpable carbon black dispersion. In a production plant for furnace black, 1,300 kg of carbon black were produced per hour with the following characteristics.

| Nitrogen surface area | $m^2/g$ | 85 |
| --- | --- | --- |
| Electromicroscopic particle size | nm | 27 |
| DPB-number | ml/100g | 98 |
| Color strength based on |  |  |

| -continued | | |
|---|---|---|
| IRB 3 | % | 100 |

In a pin beading machine, with a length of 240 cm and a diameter of 52 cm, carbon black is inserted. The rpm of the toothed shaft amounts to 700 rpm. 2,280 l of water, in which 102 kg Vanisperse CB is dissolved, is sprayed through nozzles onto the carbon black. Vanisperse CB is an anionic dispersing agent based on lignin sulfonic acid. A liquid, pumpable dispersion of the furnace black, with a solids content of about 38%, emerges from the bead making machine.

After this test, the dispersion obtained according to example 3 was tested. A beaded carbon black, which was produced with addition of 0.5% molasses, related to solid substance was used for comparison, and had the following characteristics:

| Nitrogen surface area | $m^2/g$ | 83 |
|---|---|---|
| Electron-microscopic particle size | nm | 27 |
| DPB-number | ml/100g | 100 |
| Color strength related to IRB 3 | % | 100 |

The examination of dispersibility takes place according to the instruction stated below:

The carbon black preparation at a quantity corresponding to 2.5 g of dry carbon black and 55 g of air dry bleached sulfite cellulose are agitated well in water and with a solids density of 3.4% they are stirred for 15 minutes in a Pendraulic agitator (stirrer 4 cm diameter breaker plate) at 2,100 rpm.

Test paper sheets formed from this substance with a weight of about 100 g/m² are evaluated. Undispersed carbon black particles may be detected on the paper in the form of specks.

The test results were:

| Beaded carbon black as in example 3: | poor many specks (12/cm²) |
|---|---|
| Dispersion as in example 3: | good practically free of specks (0/cm²) |

EXAMPLE 4

From a continuously operating furnace black plant, 25 kg of carbon black with the following test data:

| Nitrogen surface area | $m^2/g$ | 30 |
|---|---|---|
| Electron-microscopic particle size | nm | 50 |
| DBP-number | ml/100g | 90 |
| Color strength related to IRB 3 | % | 63 | were inserted into a bead-making machine with an inside diameter of 200 mm and an overall length of 1,600 mm and a working length of 1,080 mm.

The rpm of the pin shaft amounted to 750 rpm.

44 kg of water were sprayed therein, in which 2 kg of cell pitch (calcium lignin sulfonate-beech) were dissolved. In this mode of operation, a pumpable liquid was obtained with a carbon black content of about 35%.

In order to check the applicability of the previously described pigment for the coloration of cement, this dispersion was worked into the cement for comparison with a commercial black pigment and distribution and intensity of color were tested.

For this purpose a quantity of pigment, which corresponds to 0.5 g of carbon black was mixed dry with 75 g of Dyckerhoff white cement, then 25 ml of water were added (the water content of the liquid dispersion was taken into consideration) and mixing was continued in the wet state, at twice 30 seconds. This is then poured into a mold and hardened. Then the molded blocks were broken in two in the middle and checked visually for quality of distribution of the dyestuff:

Commercial black color on the basis of soot for example 4:Perfect uniform distribution of the dyestuff no black specks, Dispersion as in example 4: Perfect uniform distribution of the dyestuff, no black specks The cement blocks formed were then coated with a layer of oil, covered up with a covering glass and the intensity of color was measured right through the glass plate with a densitometer.

In this case high values correspond to a high jet black color.

The test values found were:

Commercial black dye on the basis of carbon black from example 4: 2.10

Dispersion, according to example 4: 2.11

From the values, it is clear that the dispersion produced according to the process may be dispersed at least as well as distinct black pigments for coloration of cement and that they are also of at least equal value in achievable intensity of color.

Further modifications of the above-described invention will be apparent to those skilled in the art from the foregoing description and are intended to be encompassed by the following claims:

We claim:

1. A process for the production of water containing carbon black preparations comprising producing furnace blacks, lamp blacks or gas blacks in a continuous production process, separating said blacks from exhaust gases, continuously feeding the blacks to a pin shaft granulator used for the production of carbon black granules wherein the water is adjusted such that the preparations contain between 30 and 80% of water, thereby obtaining well dispersable preparations in the form of a non-dusting powder, beads, or liquid, and then packaging said preparations.

2. The process for the production of aqueous carbon black preparations as in claim 1, wherein a wetting and/or dispersing agent is also introduced into the apparatus during production.

3. The process as in claim 1 or 2, wherein lignin sulfonic acids are used as dispersing agents.

4. The process as in claim 1, in which the carbon black used has the following characteristics:

| Nitrogen surface area | $m^2/g$ | 25–130 |
|---|---|---|
| Electron microscopic particle size | nm | 18–55 |
| DBP-number | ml/100g | 45–100 |
| Color strength, related to IRB 3 | % | 60–120 |

5. The process as in claim 4, wherein the carbon black used has a DBP-number of 90–140 ml/100 g.

* * * * *